(12) United States Patent
Kimura et al.

(10) Patent No.: US 7,203,032 B2
(45) Date of Patent: Apr. 10, 2007

(54) MAGNETIC RECORDING HEAD AND FABRICATION PROCESS

(75) Inventors: Hisashi Kimura, Odawara (JP); Moriaki Fuyama, Hitachi (JP)

(73) Assignee: Hitachi Global Storage Technologies Japan, Ltd., Kanagawa-ken (JP)

( * ) Notice: Subject to any disclaimer, the term of this patent is extended or adjusted under 35 U.S.C. 154(b) by 496 days.

(21) Appl. No.: 10/695,951

(22) Filed: Oct. 30, 2003

(65) Prior Publication Data
US 2004/0257702 A1 Dec. 23, 2004

(30) Foreign Application Priority Data
Jun. 23, 2003 (JP) ............................. 2003-178722

(51) Int. Cl.
*G11B 5/127* (2006.01)
(52) U.S. Cl. ..................................... 360/126
(58) Field of Classification Search ................ 360/126, 360/317, 319; 29/603.15, 603.18
See application file for complete search history.

(56) References Cited

U.S. PATENT DOCUMENTS

| | | | |
|---|---|---|---|
| 6,199,267 B1 * | 3/2001 | Koshikawa et al. | 29/603.15 |
| 6,292,334 B1 * | 9/2001 | Koike et al. | 360/319 |
| 6,935,014 B2 * | 8/2005 | Maekawa et al. | 29/603.18 |
| 2002/0034043 A1 | 3/2002 | Okada et al. | |
| 2002/0080525 A1 | 6/2002 | Sato et al. | |
| 2003/0151856 A1 * | 8/2003 | Sasaki et al. | 360/317 |

FOREIGN PATENT DOCUMENTS

| | | |
|---|---|---|
| JP | 2002-092821 | 9/2000 |
| JP | 2002-208112 | 5/2001 |

OTHER PUBLICATIONS

K. Taguchi, K. Yamakawa, N. Honda and K. Ouchi, "Narrow Trackwidth Recording with a Single-Pole Head", Journal of the Magnetics Society of Japan (with English translation), vol. 24, No. 4-2, 2000, pp. 335-338.

* cited by examiner

*Primary Examiner*—Tianjie Chen
(74) *Attorney, Agent, or Firm*—Reed Smith LLP; Stanley P. Fisher, Esq.; Juan Carlos A. Marquez, Esq.

(57) ABSTRACT

Disclosed are a thin-film magnetic recording head suitable for high density recording and its fabrication method elaborated to avoid corrosion of the main pole section of the head. A non-magnetic metal layer is formed on the top of the main pole.

4 Claims, 6 Drawing Sheets

MAGNETIC RECORDING HEAD AND FABRICATION PROCESS

BACKGROUND OF THE INVENTION

1. Field of the Invention

The present invention relates to a magnetic head comprising a single pole type head for perpendicular magnetic recording and a process of fabricating such a head.

2. Description of Related Art

In recent years, there has been a continuing need for hard disk drives (HDDs) with larger capacity and smaller dimensions which are magnetic recording/reproducing devices employed as external recording devices for data processing equipment such as computers. Accordingly, HDD manufacturers mainly pour their efforts into improving the areal recording density of HDD heads to meet such need. However, in order to achieve higher density recording performance with conventional longitudinal magnetic recording, the recording layer thickness must be made thinner, because a demagnetizing field comes to have maximum energy in the region of magnetization-reversal transition in a magnetic hysteresis (MH) loop of magnetization for recording on a recording medium. In consequence, a problem is presented that thermal disturbance resulting from the demagnetizing energy erases recorded data. Meanwhile, for perpendicular magnetic recording in which the direction of magnetization for recording is the direction of thickness of a medium, it is relatively less needed to thin the thickness of the medium, because the demagnetizing field comes to have minimum energy in the region of magnetization-reversal transition in the MH loop, and, thus, high density recording performance is easy to achieve.

When recording a signal on a perpendicular recording medium with a magnetic head for perpendicular magnetic recording, or namely, a perpendicular magnetic head (single pole type head), an electric signal is converted into a magnetic signal by coils and magnetic flux is excited in a main pole and a return pole. Part of the magnetic flux travels from the return pole and through the main pole and passes through the recording layer of a recording medium. The magnetic flux passes through a soft magnetic under layer under the recording layer and returns to the return pole, thus forming a closed loop. The return pole is used to return magnetically and efficiently the magnetic flux generated from the main pole and passed through the recording layer and under layer of the recording medium. Through this magnetic flux flow, magnetization takes place on the perpendicular recording medium, thus recording the signal on the medium. An example of such a magnetic head is reported in the Journal of the Magnetics Society of Japan, Vol. 24, 335–338 (2000).

With the improvement of areal recoding density of the above-mentioned perpendicular magnetic recording heads, it is desired that the width of a recording track should be reduced. However, reduction in the recording track width causes decrease in a magnetic field which is generated from the tip of the main pole and across the magnetic recoding medium. Thus, the thickness of the main pole should be thicker to prevent the decrease in the magnetic field. Meanwhile, a magnetic disk drive must perform recording and reproduction in a wide range of inner to outer concentric circular tracks of a magnetic recording medium. However, its magnetic head performs write and readback operation to/from the concentric circular tracks of the magnetic recording medium at a skew angle of about 0 to 15° from the tangent to the revolving direction of the magnetic recording medium. If the main pole has a rectangular air-bearing surface, the recording track width cannot be reduced. Therefore, methods of tailoring the magnetic pole shape for narrower tracks by making the track width of the leading side of the main pole narrower than that of the trailing side thereof have been proposed.

Examples of methods in which a magnetic head is fabricated such that the track width of the leading side of the air-bearing surface of the main pole is narrower than that of the trailing side thereof are given below. JP-A No. 92821/2002 discloses a method of forming a main pole having an inverted trapezoid shape, which comprises forming a resist frame on a non-magnetic insulator layer, forming a trench on the non-magnetic insulator layer by reactive ion etching (RIE), plating the surface with a magnetic layer, and chemical mechanical polishing (CMP). JP-A No. 197609/2002 discloses a method of forming a main pole having an inverted trapezoid shape, which comprises forming a resist frame on a plating under layer and plating the surface with a magnetic layer and a non-magnetic layer. JP-A No. 208112/2002 discloses a method of forming a main pole having an inverted trapezoid shape, which comprises depositing a non-magnetic layer on a magnetic layer, forming a resist frame, plating, and dry etching.

[Non-Patent Document 1] Journal of the Magnetics Society of Japan, Vol. 24, 335–338 (2000)

[Patent Document 1] JP-A No. 92821/2002

[Patent Document 2] JP-A No. 197609/2002

[Patent Document 3] JP-A No. 208112/2002

SUMMARY OF THE INVENTION

As for the method of JP-A No. 92821/2002, it is anticipated that the depth of the trench formed on the non-magnetic insulator layer differs for different lots and the main pole thickness varies by non-uniform CMP-planarization in the substrate plane. This variance in the main pole thickness is undesirable because it causes variation in the magnetic field for recording. As for the method of JP-A No. 197609/2002, plating thickness between narrow-spaced resist frame lines is hard to control and this may cause variation in the main pole thickness. As for the method of JP-A No. 208112/2002, the formation of the non-magnetic layer is intended to protect the top surface of the magnetic layer during dry etching and this method is lacking in awareness of corrosion of the magnetic layer.

As a prototype of the present invention, the inventors conceived the adoption of a method of forming a main pole in a single pole type head, which comprises forming a non-magnetic insulator layer on a magnetic layer, forming a photoresist on the non-magnetic insulator layer, selectively removing the non-magnetic insulator layer by reactive ion etching, and shaping the magnetic layer into a predetermined shape by ion milling, using the remaining non-magnetic insulator layer as a mask, in order to tailor the main pole shape for narrow tracks. However, it was found that reactive etching of the non-magnetic insulator layer with mixed gas including $Cl_2$ or $BCl_3$ caused corrosion in the magnetic layer made of FeCo or CoNiFe.

It is therefore an object of the present invention to fabricate a magnetic head comprising a single pole type head suitable for narrow tracks, while preventing corrosion of the magnetic layer.

The present invention provides a method of forming a main pole in a single pole type head which is included as a write head in a magnetic head, the method comprising forming a non-magnetic insulator layer on a magnetic layer, forming a photoresist on the non-magnetic insulator layer, selectively removing the non-magnetic insulator layer by reactive ion etching, and shaping the magnetic layer into a predetermined shape by ion milling, using the remaining non-magnetic insulator layer as a mask, in order to tailor the main pole shape for narrow tracks. In order to enhance the capability of the magnetic pole for writing in producing a magnetic field, material which has high-saturation magnetic flux density, such as FeCo and CoNiFe, is used for a magnetic layer that is processed to be the main pole. When the non-magnetic insulator layer is selectively etched by reactive etching with mixed gas including $Cl_2$ or $BCl_3$, this etching causes corrosion of the magnetic layer made of FeCo or CoNiFe. Thus, the head structure including the main pole is constructed not to expose the magnetic layer to etching gas when etching the non-magnetic insulator layer. Concretely, a non-magnetic metal layer which is hard to etch is formed on the magnetic layer. The non-magnetic metal layer is made of Ta, Cr, NiCr, or the like and its thickness should be 5–30 nm.

DETAILED DESCRIPTION OF THE PREFERRED EMBODIMENTS

Preferred embodiments of the present invention will be described in detail hereinafter with reference to the accompanying drawings.

Figure 1:
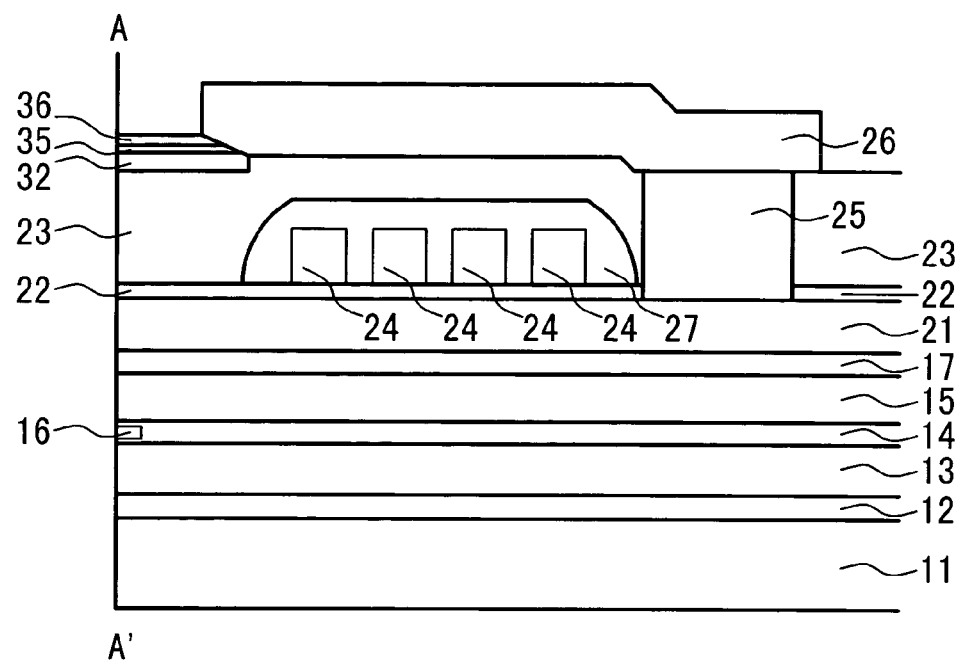
FIG. 1 is a cross-sectional view of a magnetic head example according to the present invention.
Figure 2:
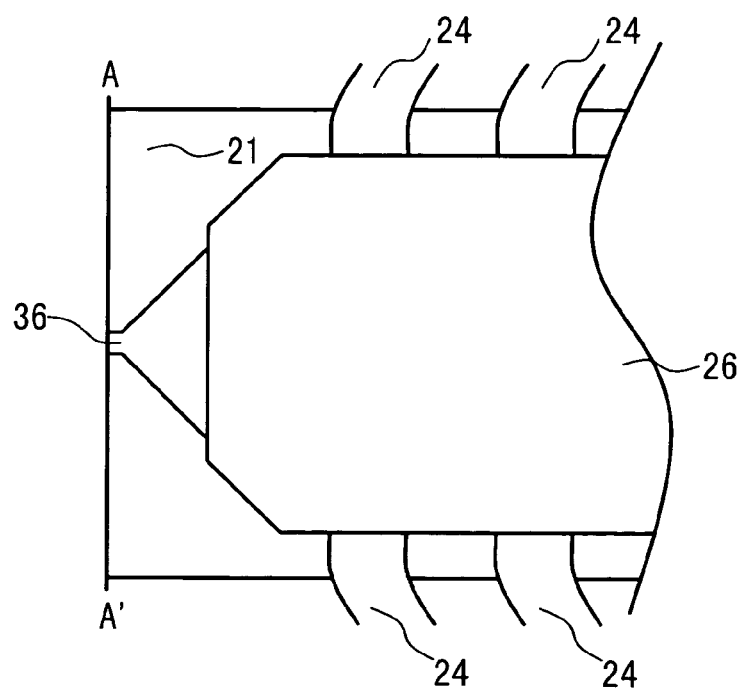
FIG. 2 is a plane view of the magnetic head example according to the present invention.
Figure 3:
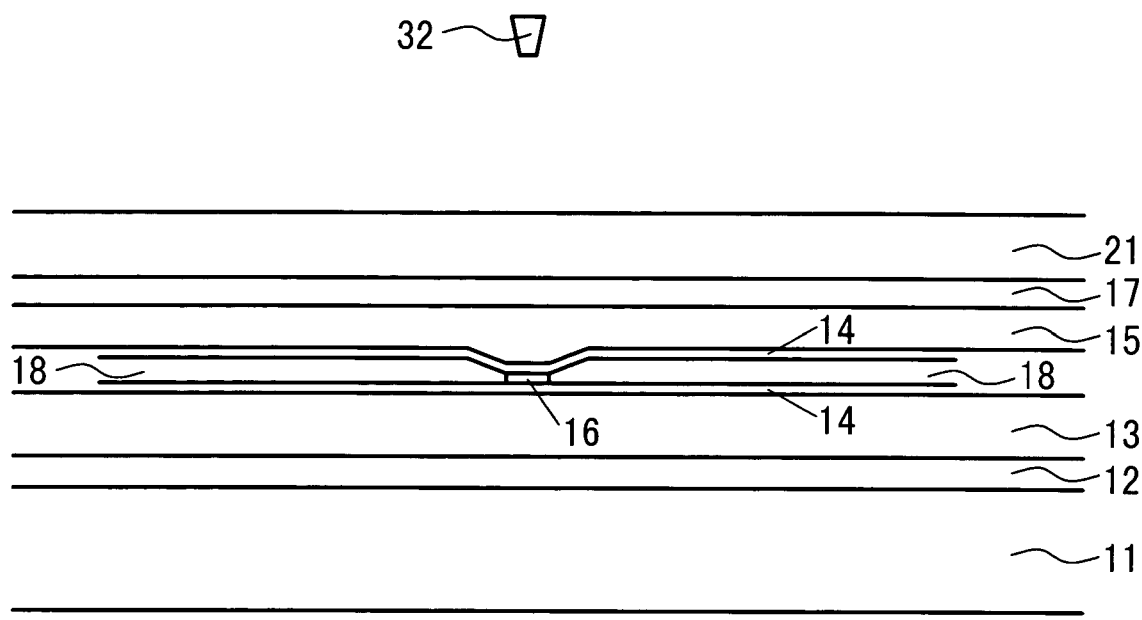
FIG. 3 shows a head plane that faces a recording medium in the magnetic head example according to the present invention.
Figure 4:
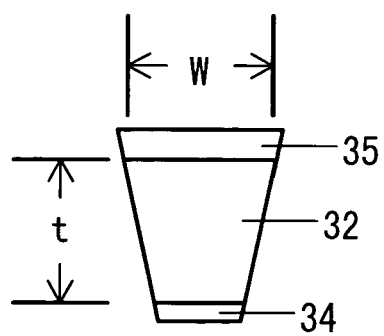
FIG. 4 is an enlarged view of a magnetic pole that constitutes a part of the magnetic head plane that faces a recording medium.

An example of a perpendicular recording magnetic head fabricated, according to the present invention, is shown in FIGS. 1 to 4. FIG. 1 is a cross-sectional view of the magnetic head, which represents a plane perpendicular to both a head plane that faces a recording medium and a substrate plane. FIG. 2 is a plane view thereof, which represents the right half of the plane perpendicular to the head plane that faces a recording medium and the substrate plane. FIG. 3 depicts the magnetic head plane that faces a recording medium. FIG. 4 is an enlarged view of a main pole that constitutes a part of the magnetic head plane that faces a recording medium. In the above figures, reference numeral 11 denotes a substrate, 12 denotes an insulator layer, 13 denotes a lower shield, 14 denotes an insulator layer, 15 denotes an upper shield, 16 denotes a magnetoresistive element, 17 denotes an insulator layer, and 18 denotes electrodes. Reference numeral 21 denotes a return pole, 22 denotes an insulator layer, 23 denotes an insulator layer, 24 denotes coils, 25 and 26 denote yokes, 27 denotes an organic insulator layer, 32 denotes a maim pole, 34 denotes a under layer, 35 denotes a first non-magnetic metal layer, and 36 denotes a non-magnetic insulator layer. Plane A–A' is the air-bearing surface of the magnetic head.

A readback section of the magnetic head shown includes the lower shield 13, magnetoresistive layer 16, and upper shield 15. To both the ends of the magnetoresistive layer 16, the electrodes 18 and a magnetic domain control layer, which is not shown, are connected. For the magnetoresistive layer, an Anisotropic Magnetoresistive (AMR) layer, a Giant Magnetoresistive (GMR) layer, or the like that has magnetoresistance can be used. Moreover, as the magnetoresistive layer 16, a tunnel junction magnetoresistive (TMR) layer or a current perpendicular to plane (CPP) type magnetoresistive layer which allows current to flow perpendicular to the film structure can be used. A write section of the magnetic head shown is constructed such that the coils 24 are formed on the insulator layer 22 covering the return pole 21 and covered with the insulator layer 27 and the return pole 21 is magnetically connected via the yokes 25 and 26 to the main pole 32.

As shown in the plane view of FIG. 2, the main pole 32 has a 50–500 nm long narrow end from the air-bearing surface, perpendicular to the air-bearing surface A–A', and fans out towards the inside. Employing the main pole structure of this shape, the magnetic head that produces a great magnetic field with little track width variance can be attained.

As shown in FIG. 3, the view of the air-bearing surface of the magnetic head of the present invention, the main pole 32 is formed above the return pole 21, the insulator layer 23 existing between the main pole 32 and the return pole 21. While the return pole 21 is positioned on the leading side of the main pole 32 in this example, the positional relationship between the main pole 32 and return pole 21 may be upside down. If the return pole 21 is positioned above the main pole 32, the coils 24 and yoke 25 are formed in the upper layer of the main pole 32.

In the enlarged view of the main pole shown in FIG. 4, the under layer 34 is formed under the main pole 32 to enhance the magnetic characteristics of the main pole 32 and the first non-magnetic metal layer 35 is formed on the tope of the main pole 32. The main pole 32 is made of a magnetic layer of material which has high-saturation magnetic flux density, such as FeCo and CoNiFe, or a multilayered film consisting of FeCo and non-magnetic layers. As material of the under layer 34, NiCr, Au, Cu, or Cr is used. As material of the first non-magnetic metal layer 35, NiCr, Cr, Ta, or TaW is used.

By shaping the air-bearing surface of the main pole 32 structure such that the track width in the bottom side of the main pole 32 is narrower as shown in FIG. 4, the magnetic head that ensures that accidentally erasing data in tracks adjacent to the target track does not occur can be attained. The track width w of the main pole 32 which is a single magnetic layer or a multilayered structure consisting of magnetic and non-magnetic layers becomes narrower as the recording density increases and its range is, for example, 40–200 nm. It is desirable that the thickness t of the main pole 32 falls within a range of 0.5–3 times as long as the track width. It is desirable that the thickness of the under layer 34 falls within a range of 2–20 nm.

Next, a method of fabricating the magnetic head according to the present invention will be described. Because the layers below the main pole 32 are formed in the same way as the conventional magnetic head fabrication method, the description focuses on forming the main pole 32 and upper layers.

FIG. 5 shows cross-sectional views of magnetic head in the steps constituting an example of the method of fabricating the magnetic head according to the present invention. The under layer 34 is formed on the insulator layer 23 and, on the under layer 34, as is shown in FIG. 5A, a magnetic layer that is processed to be the main pole 32 is formed (hereinafter, the magnetic layer that is processed to be the main pole 32 may be referred to as, simply, the main pole 32), the magnetic layer being 200 nm thick and made of, for example, FeCo or CoNiFe. On the main pole 32, the first non-magnetic metal layer 35 and the non-magnetic insulator layer 36 are formed. The first non-magnetic metal layer 35 should be 5–30 nm thick and the non-magnetic insulator layer 36 should be 300–1000 nm thick. Next, a resist 50 is formed on the non-magnetic insulator layer 36, as is shown in FIG. 5B, and the resist 50 is patterned so as to be used as a first mask. The resist should be 300–1500 nm thick. Next, as is shown in FIG. 5C, using the first mask, the non-magnetic insulator layer 36 is etched into a predetermined shape with mixed gas including $Cl_2$ or $BCl_3$ and, then, the resist 50 is removed and a second mask is formed. However, the next step may be performed with the resist 50 remaining as it is.

It is desirable that the non-magnetic insulator layer 36 be etched so as to be vertical or approximately vertical to the substrate 11, but may be etched into a trapezoid-like shape with the top width being slightly smaller than the bottom width. The mixed gas including $Cl_2$ or $BCl_3$ used for etching the non-magnetic insulator layer 36 causes corrosion of the main pole 32. Therefore, in order not to expose the main pole 32 to the etching gas, the first non-magnetic metal layer 35 is sandwiched between the main pole 32 and the non-magnetic insulator layer 36. For the first non-magnetic metal layer 35, it is desirable to use material which is etched at a lower rate than the rate at which the non-magnetic insulator layer 36 is etched, and this material may be, for example, NiCr, Cr, Ta, or TaW. Because the first non-magnetic metal layer 35 is etched if it is very thin, the thickness of the first non-magnetic metal layer 35 should be 5 nm or more. Through this constitution, the main pole 32 can be prevented from being corroded by the mixed gas.

Figure 5A:
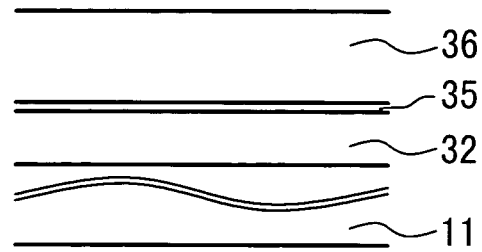
FIGS. 5A, 5B, 5C, and 5D show cross-sectional views of magnetic head in the steps constituting an example of the method of fabricating the magnetic head according to the present invention.
Figure 5B:
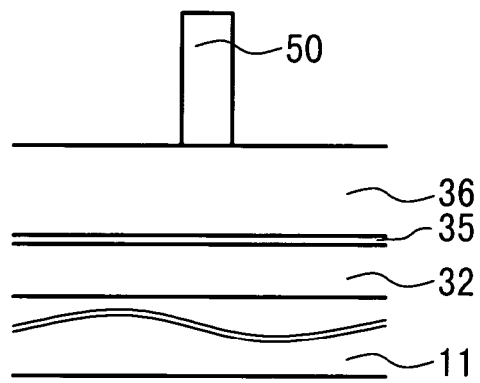
Figure 5C:
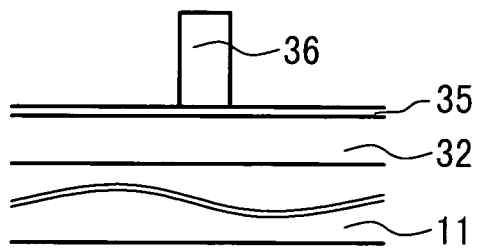
Figure 5D:
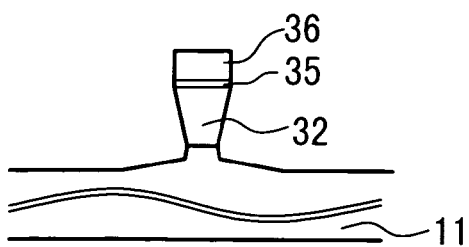

FIG. 5D depicts the main pole 32 shaped into a designed shape by ion milling, using the second mask. For the ion milling conditions, milling angles in the range of 40° to 60° if the normal direction with regard to the substrate vertical is 0° are desirable. By this milling, the main pole 32 is etched into a rectangular shape. Moreover, with milling angles in the range of 50° to 75°, further milling is performed so that the non-magnetic insulator layer 36 is shaped into a trapezoid-like shape and the first non-magnetic metal layer 35 and the main pole 32 are shaped into an inverted trapezoid shape, as is shown in FIG. 5D. It is desirable that the non-magnetic insulator layer 36 be 20–300 nm thick after being milled. As the material of the non-magnetic insulator layer 36, it is desirable to use $Al_2O_3$ which is milled at a lower rate than the rate at which FeCo or CoNiFe which is the material of the main pole 32 is milled, in order to shape the main pole 32 into an inverted trapezoid shape by ion milling. When ion milling the main pole 32, it takes longer to shape the main pole 32 into an inverted trapezoid shape by the ion milling if the first non-magnetic metal layer 35 is thick. Thus, the thickness of the first non-magnetic metal layer 35 should be 30 nm or less.

FIG. 6 shows cross-sectional views of magnetic head in the steps constituting another example of the method of fabricating the magnetic head according to the present invention. The under layer 34 is formed on the insulator layer 23 and, on the under layer 34, as is shown in FIG. 6A, a magnetic layer that is processed to be the main pole 32 is formed, the magnetic layer being 200 nm thick and made of, for example, FeCo or CoNiFe. On the main pole 32, the first non-magnetic metal layer 35 which is made of NiCr, Cr, Ta, TaW, or the like, the non-magnetic insulator layer 36 which is made of $Al_2O_3$, and a second non-magnetic metal layer 37 which is made of a Cr, Ni, Au, Pt, or Ru single layer, multilayered film, or alloy film are formed sequentially. The first non-magnetic metal layer 35 should be 5–30 nm thick, the non-magnetic insulator layer 36 be 300–1000 nm thick, and the second non-magnetic metal layer 37 be 50–200 nm thick. Next, the resist 50 is formed on the second non-magnetic metal layer 37. As is shown in FIG. 6B, the resist 50 is patterned into a designed shape by a photolithography technique which is provided by electron beam drawing equipment or a demagnification projection aligner and its thickness should be, for example, 300–1500 nm.

Figure 6A:
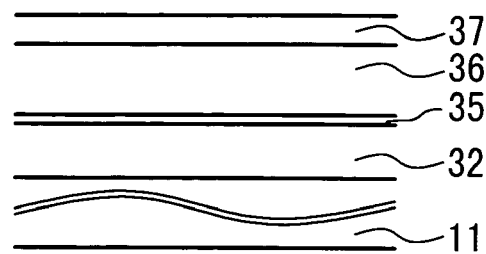
FIGS. 6A, 6B, 6C, 6D, and 6E show cross-sectional views of magnetic head in the steps constituting another example of the method of fabricating the magnetic head according to the present invention.
Figure 6B:
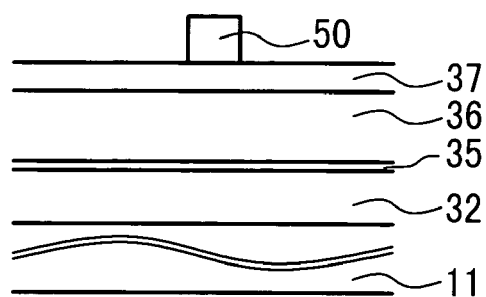
Figure 6C:
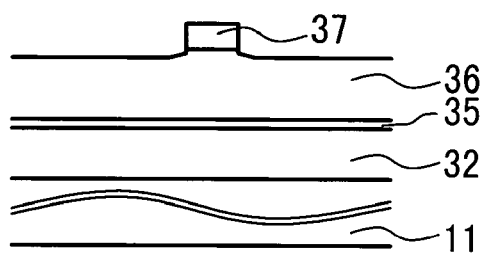

FIG. 6C depicts the second non-magnetic metal layer 37 etched by ion milling and, on this stage, the resist layer 50 was removed. It is desirable that the second non-magnetic metal layer 37 be etched so as to be vertical to the substrate plane. To accomplish such etching, milling angles in the range of 40° to 60° if the normal direction with regard to the substrate vertical is 0° are desirable.

Figure 6D:
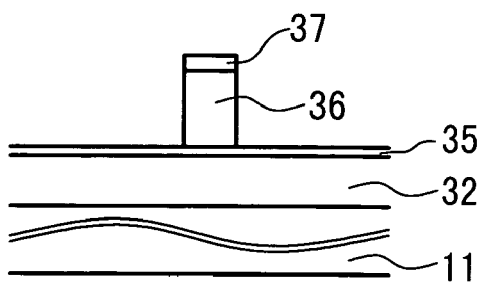

Next, as is shown in FIG. 6D, the non-magnetic insulator layer 36 is etched with mixed gas including $Cl_2$ or $BCl_3$. It is desirable that the non-magnetic insulator layer 36 be etched so as to be vertical or approximately vertical to the substrate 11. To etch the non-magnetic insulator layer 36 as above, it is desirable to use etching gas including $Cl_2$ or $BCl_3$ in the reactive etching process.

Figure 6E:
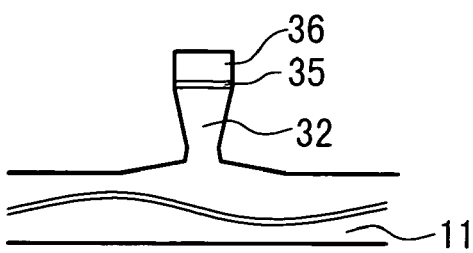

FIG. 6E depicts the main pole 32 shaped into a designed shape by ion milling. For ion milling conditions, milling angles in the range of 40° to 60° are desirable. By this milling, the main pole 32 is etched into a rectangular shape. Moreover, with milling angles in the range of 50° to 75°, further milling is performed so that the non-magnetic insulator layer 36 is shaped into a trapezoid-like shape and the first non-magnetic metal layer 35 and the main pole 32 are shaped into an inverted trapezoid shape.

The mixed gas including $Cl_2$ or $BCl_3$ used for etching the non-magnetic insulator layer 36 causes corrosion of FeCo or CoNiFe which constitutes the main pole 32. Therefore, in order not to expose the main pole 32 to the etching gas, the first non-magnetic metal layer 35 is sandwiched between the main pole 32 and the non-magnetic insulator layer 36. For the first non-magnetic metal layer 35, it is desirable to use material which is etched at a lower rate than the rate at which the non-magnetic insulator layer 36 is etched, and this material may be, for example, NiCr, Cr, Ta, or TaW. The first non-magnetic metal layer 35 should be 5–30 nm thick. This is because, if this layer is too thin, it is etched so that it cannot prevent the corrosion of the main pole 32 and because, if this layer is too thick, it takes longer to shape the main pole 32 into an inverted trapezoid shape by the ion milling.

In the present embodiment, instead of the resist, the second non-magnetic metal layer is used to mask the non-magnetic insulator layer 36 when etching the non-magnetic insulator layer 36. When the non-magnetic insulator layer 36 is etched in Embodiment 1, the resist as thick as or thicker than the non-magnetic insulator layer 36 is considered necessary. According to the present embodiment, when etching the non-magnetic insulator layer 36, it is sufficient to form the second non-magnetic metal layer with thickness that is about one fifth of the thickness of the non-magnetic insulator layer, because the rate at which the non-magnetic insulator layer 36 is etched is much greater than the rate at which the second non-magnetic metal layer is etched. Therefore, the required thickness of the resist 50 is less than the corresponding resist thickness required in Embodiment 1 and, consequently, the resist 50 can be patterned accurately and the accuracy of track width is enhanced.

FIG. 7 shows cross-sectional views of magnetic head in the steps constituting yet another example of the method of fabricating the magnetic head according to the present invention. The under layer 34 is formed on the insulator layer 23 and, on the under layer 34, as is shown in FIG. 7A, a magnetic layer that is processed to be the main pole 32 is formed, the magnetic layer being 200 nm thick and made of, for example, FeCo or CoNiFe. On the main pole 32, the first non-magnetic metal layer 35, non-magnetic insulator layer 36, and the second non-magnetic metal layer 37 are formed sequentially. As the first non-magnetic metal layer 35, a 5–30 nm thick layer of NiCr, Cr, Ta, or TaW is deposited. As the non-magnetic insulator layer 36, a 300–1000 nm thick layer of $Al_2O_3$ is deposited. The second non-magnetic metal layer should be 5–20 nm thick and its material may be NiCr, Cr, Ta, TaW, Cu, or Au.

Figure 7A:
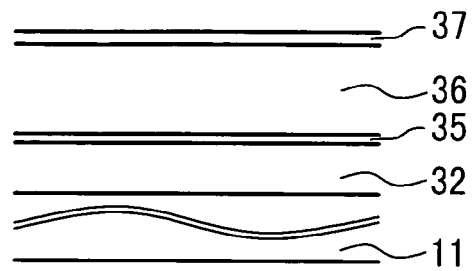
FIGS. 7A, 7B, 7C, and 7D show cross-sectional views of magnetic head in the steps constituting yet another example of the method of fabricating the magnetic head according to the present invention.
Figure 7B:
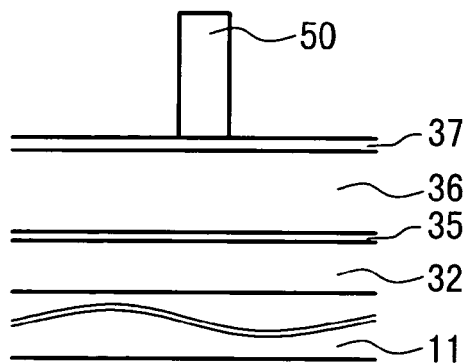

Next, as is shown in FIG. 7B, the resist 50 is formed on the second non-magnetic metal layer 37 and patterned by electron beam drawing equipment. When the resist 50 is patterned by the electron beam drawing equipment, it is desirable that the substrate surface be conductive to prevent the substrate from being charged up by the electron beam. Also, it is desirable that the substrate surface should be a non-magnetic layer because a magnetic surface layer of the substrate bends and accelerates electron beams. Thus, the second non-magnetic metal layer 37 covers the non-magnetic insulator layer 36.

Figure 7C:
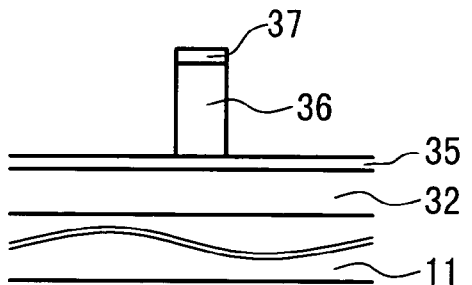

Next, as is shown in FIG. 7C, the second non-magnetic metal layer 37 and the non-magnetic insulator layer 36 are etched with mixed gas including $Cl_2$ or $BCl_3$ and then the resist is removed. However, the next step may be performed with the resist remaining as is. If the second non-magnetic metal layer 37 is hard to etch through a chemical reaction with the mixed gas including $Cl_2$ or $BCl_3$, its thickness should be thinned so as to be etched. Alternatively, the second non-magnetic metal layer 37 may be removed by ion milling.

Figure 7D:
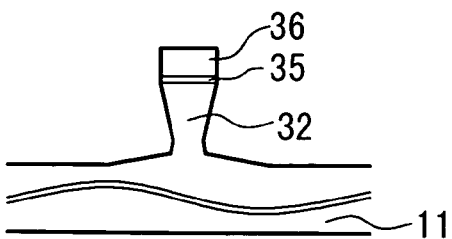

FIG. 7D depicts the main pole 32 shaped into a designed shape by ion milling. For ion milling conditions, milling angles in the range of 40° to 60° are desirable. By the ion milling, the main pole 32 is etched into a rectangular shape. Moreover, with milling angles in the range of 50° to 75°, further milling is performed so that the non-magnetic insulator layer 36 is shaped into a trapezoid-like shape and the first non-magnetic metal layer 35 and the main pole 32 are shaped into an inverted trapezoid shape.

In the present embodiment, the resist 50 is patterned, using the electron beam drawing equipment. Therefore, it is desirable that the substrate surface is conductive and non-magnetic. Thus, the second non-magnetic metal layer 37 covers the non-magnetic insulator layer 36 as is the case in Embodiment 2. When etching the non-magnetic insulator layer 36, the resist 50 is used as the mask, thus curtailing the process time. The resist patterning with the electron beam drawing equipment enhances the accuracy of track width.

FIG. 8 shows cross-sectional views of magnetic head in the steps constituting an example of post-process after forming the main pole. In FIGS. 8A to 8D, the illustrations at the right are the views of cross sections B–B' in the left-hand illustrations.

Figure 8A:
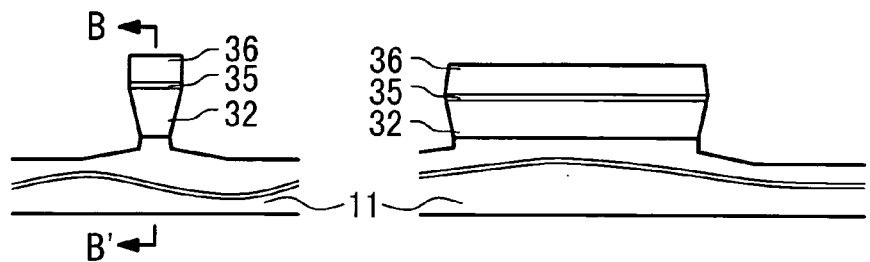
FIGS. 8A, 8B, 8C, and 8D show cross-sectional views of magnetic head in the steps constituting an example of post-process after forming the main pole.
Figure 8B:
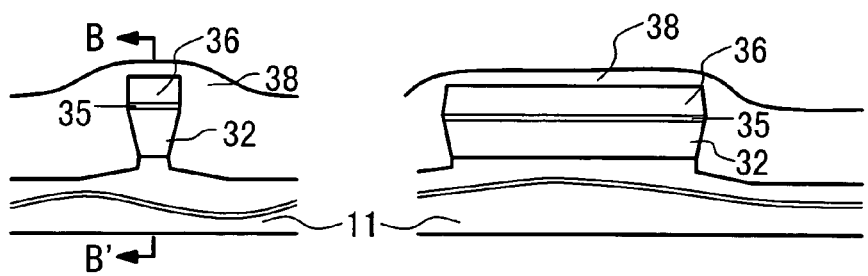
Figure 8C:
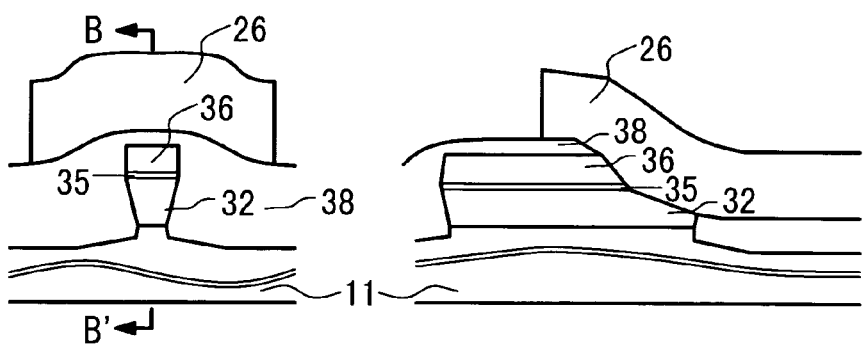
Figure 8D:
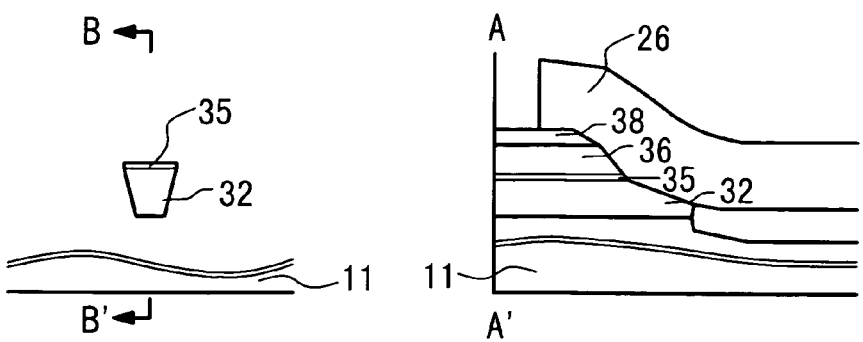

FIG. 8A depicts the main pole 32 shaped into an inverted trapezoid shape. Next, as is shown in FIG. 8B, an insulator layer 38 is deposited to cover the main pole 32, the first non-magnetic metal layer 35, and the non-magnetic insulator layer 36. Next, as is shown in FIG. 8C, by ion milling, the non-magnetic insulator layers 36 and 38 are removed from a region where a connection is made between the main pole 32 and the yoke 26 and the yoke 26 is formed. After the step of FIG. 8C, furthermore, terminals are formed and then the air-bearing surface is finished, which is depicted in FIG. 8D. By carrying out a sequence of the above-described steps of processing, the magnetic head including the main pole 32 having an inverted trapezoid shape can be attained.

What is claimed is:

1. A method of fabricating a magnetic head comprising a single pole type head which includes a main pole and a return pole, said method comprising the steps of:
    forming a magnetic layer which is processed to be said main pole;
    forming a first non-magnetic metal layer and a non-magnetic insulator layer in order on said magnetic layer;
    forming a first mask of a resist layer on said non-magnetic insulator layer;
    shaping said non-magnetic insulator layer by reactive ion etching, using said first mask, thus forming a second mask; and
    shaping said magnetic layer into a designed shape of said main pole, using the second mask.

2. The method of fabricating a magnetic head according to claim 1, wherein said magnetic layer is a FeCo layer, a CoNiFe layer, or a multilayered film consisting of FeCo and non-magnetic layers and etching gas that is used for said reactive ion etching includes $Cl_2$ or $BCl_3$.

3. The method of fabricating a magnetic head according to claim 2, wherein said first non-magnetic metal layer is made of NiCr, Cr, Ta, or TaW and said non-magnetic insulator layer is made of $Al_2O_3$.

4. The method of fabricating a magnetic head according to claim 1, wherein said first non-magnetic metal layer has a thickness falling within a range of 5–30 nm.

* * * * *